(12) United States Patent
Marinelli et al.

(10) Patent No.: US 11,463,720 B2
(45) Date of Patent: Oct. 4, 2022

(54) FUNCTIONAL SAFETY METHOD, SYSTEM, AND CORRESPONDING COMPUTER PROGRAM PRODUCT

(71) Applicant: STMicroelectronics S.r.l., Agrate Brianza (IT)

(72) Inventors: Nicola Marinelli, Mediglia (IT); Riccardo Gemelli, Carugate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 214 days.

(21) Appl. No.: 16/142,497

(22) Filed: Sep. 26, 2018

(65) Prior Publication Data

US 2019/0098327 A1    Mar. 28, 2019

(30) Foreign Application Priority Data

Sep. 27, 2017   (IT) .................. 102017000108177

(51) Int. Cl.
| | |
|---|---|
| *H04N 19/467* | (2014.01) |
| *H04N 19/176* | (2014.01) |
| *H04N 19/87* | (2014.01) |
| *H04N 19/172* | (2014.01) |
| *G06F 21/60* | (2013.01) |
| *H04N 19/426* | (2014.01) |
| *H04N 19/68* | (2014.01) |

(52) U.S. Cl.
CPC .......... *H04N 19/467* (2014.11); *G06F 21/60* (2013.01); *H04N 19/172* (2014.11); *H04N 19/176* (2014.11); *H04N 19/427* (2014.11); *H04N 19/68* (2014.11); *H04N 19/87* (2014.11)

(58) Field of Classification Search
None
See application file for complete search history.

(56) References Cited

U.S. PATENT DOCUMENTS

| | | | |
|---|---|---|---|
| 5,612,979 A | * | 3/1997 | Takano .............. H04N 21/4302 375/E7.278 |
| 6,208,745 B1 | | 3/2001 | Florencio et al. |
| 2004/0101160 A1 | * | 5/2004 | Kunisa .................. G06T 1/0071 382/100 |
| 2004/0190617 A1 | * | 9/2004 | Shen .................... H04N 19/159 375/240.16 |
| 2006/0005029 A1 | * | 1/2006 | Petrovic ................ G06T 1/0021 713/176 |
| 2009/0110231 A1 | * | 4/2009 | Rzeszewski .......... G06T 1/0028 382/100 |

(Continued)

OTHER PUBLICATIONS

Pullaperuma, P. P. et al., "Taxonomy of file fragments using Gray-Level Co-Occurence Matrices," IEEE 2013 International Conference on Digital Image Computing: Techniques and Applications (DICTA); Dec. 23, 2013, 7 pages.

(Continued)

*Primary Examiner* — Kaitlin A Retallick
(74) *Attorney, Agent, or Firm* — Slater Matsil, LLP

(57) ABSTRACT

A method, includes: storing at least one set of data in a memory space, wherein the at least one set of data stored has a memory footprint in the memory space; and coupling, to the at least one set of data, a respective counter indicative of the at least one set of data, wherein the respective counter is embedded in the at least one set of data without increasing the memory footprint in the memory space.

20 Claims, 7 Drawing Sheets

(56) References Cited

U.S. PATENT DOCUMENTS

| | | |
|---|---|---|
| 2012/0093356 A1* | 4/2012 | Seshadri ............ H04N 1/32187 |
| | | 382/100 |
| 2012/0300971 A1* | 11/2012 | Bause .............. H04N 21/23614 |
| | | 382/100 |
| 2014/0002735 A1 | 1/2014 | O'Mahony |
| 2014/0184647 A1* | 7/2014 | Tessel .................. A61B 5/7425 |
| | | 345/634 |
| 2016/0035058 A1 | 2/2016 | Chalamala et al. |
| 2016/0080602 A1* | 3/2016 | Ishida ................ H04N 1/32267 |
| | | 358/3.28 |
| 2017/0316189 A1 | 11/2017 | Winograd |

OTHER PUBLICATIONS

Ali, Mohammed Athar et al., "Improved Watermark Payload Capacity Using DE On IPCM Macroblocks in H.264/AVC," IEEE 5th International Conference on Computer Sciences and Convergence Information Technology, Nov. 30-Dec. 2010; 99. 594-599.

Zhang, Zhengwei et al., "An improved reversible image watermarking algorithm based on difference expansion," International Journal of Distributed Sensor Networks, vol. 13(1), 2017, 15 pages.

* cited by examiner

FUNCTIONAL SAFETY METHOD, SYSTEM, AND CORRESPONDING COMPUTER PROGRAM PRODUCT

CROSS-REFERENCE TO RELATED APPLICATIONS

This application claims priority to Italian Patent Application No. 102017000108177, filed on Sep. 27, 2017, which application is hereby incorporated herein by reference.

TECHNICAL FIELD

The present description relates to a functional safety method, system, and corresponding computer program product.

BACKGROUND

Functional safety of electric/electronic systems in the automotive field is regulated by standards such as e.g. the ISO26262 standard, which defines four Automotive Safety Integrity Levels (ASILs) and associated methods, metrics, processes and documents. Similar standards exist in other mission-critical domains (e.g. industrial, aerospace, other transportation).

Functional safety is an important factor for Advanced Driver Assistance System (ADAS) applications and, in the longer term, for fully autonomous driving.

Functional safety is pursued in the first place by identifying the hazards to which a system is exposed, so that corresponding risks can be evaluated and specific countermeasures implemented in the context of system development.

For assisted or automated control systems involving acquisition, processing and display of video streams the so-called "frozen image" hazard is a functional safety concern: a "frozen image" event can be defined as the unexpected capture and/or processing and/or display of outdated images or, in other terms, as the unexpected re-use of an obsolete image in the place of the most up-to-date version notionally available.

Such a repetition is potentially dangerous insofar as it may mislead a control system and/or an operator (e.g. a driver) analyzing and/or looking at images being captured and/or displayed, whose contents are per se credible, but outdated if compared with the real current status of a scene being monitored.

The frozen image hazard is related to the possible repetition over time of a same realistic image content and is relevant for those systems where some sort of storing of incoming images is included as part of their normal behavior. If such a storage is not contemplated, a frozen image event is possible for images which are synthesized internally to the system; however, synthesized images are usually not realistic and are therefore of little concern for the frozen image case.

In systems implemented with digital electronics, storage of image contents is implemented by means of data buffers, namely portions of digital storage media that are written and read in a synchronized way by the rest of the logic (including any software running on programmable logic).

More generally, the frozen image hazard can affect sampled data sets other than images. Digitized radar echoes are an exemplary case of such sampled data sets which may be exposed to such "freezing" hazard.

Improved solutions are thus desirable in order to address the issues outlined above.

SUMMARY

An object of one or more embodiments is to contribute in providing such an improved solution.

One or more embodiments may relate to a corresponding system.

One or more embodiments may relate to a computer program product loadable in the memory of at least one data processing circuit (e.g. a computer or controller) and including software code portions implementing the method of one or more embodiments. As used herein, reference to such a computer program product is understood as being equivalent to reference to a computer-readable medium containing instructions for controlling a programmable data processing circuit in order to co-ordinate implementation of a method according to one or more embodiments. Reference to "at least one" data processing circuit is intended to highlight the possibility for one or more embodiments to be implemented in modular and/or distributed form.

In one or more embodiments, a same memory space, e.g. a buffer, can be shared by useful information (e.g. image information) and an associated (e.g. frame) counter without increasing the memory footprint.

In one or more embodiments this may apply to a single counter instance as well as to plural instances of a counter.

In one or more embodiments, sharing a same memory space while reducing and virtually avoiding possible data losses may involve fragmenting (that is "breaking up"), notionally even down to portions or "bits" including a single information bit, the counter information that is added, with the possibility of selectively identifying the storing positions of the counter portions resulting from fragmentation.

The foregoing may facilitate coverage of partial freezing events, such as an image being partially frozen.

In one or more embodiments, plural counter instances may facilitate (statistical) coverage of partial freezing events, while retaining the possibility of fragmenting the related information and selectively configuring individual storing positions for the bits resulting from fragmentation.

In one or more embodiments, resorting to a watermarking technique facilitates implementing functional safety as a separate component with respect to the producer/consumer blocks. This facilitates a direct re-use of legacy/consumer blocks without changes being required.

In one or more embodiments, embedding (e.g. watermarking) the counter information in the e.g. image information content (so-to-say, by mixing the counter information therewith) makes it possible to recover the counter information without adversely affecting the information content to which the counter is added.

Embedding the counter information in such information content may be advantageous for various reasons. As an example, one or more embodiments can be applied also in video application scenarios where a camera outputs a seamless flow of video frames, in a predetermined format, where no reserved areas may be available for adding the counter information in clear. As a further example, by embedding (e.g., mixing) the counter information with the e.g. image information content, controlling consistency of the counter information may (at least in part) extend to controlling correct reception of the e.g. image information content (e.g. in the case of a partially frozen image). If, for any reason, the e.g. image information content received is corrupted, a good likelihood exists that this will apply also to the counter information insofar as this is de facto a part of the e.g. image information content.

One or more embodiments may provide one or more of advantages. As a first example, one or more embodiments provide the advantage of compatibility and modularity with existing IPs "unaware" of the frozen image hazard. This facilitates achieving compatibility at a system level between producer and consumer IPs in terms of frozen image detection support, which would not be easy to achieve when connecting different IPs embedding some sort of protection against the frozen image hazard. The fact that the buffer footprint is not increased facilitates transparent compatibility, with an otherwise acceptable increase of data latency between a producer IP and memory and between memory and a consumer IP. As a second example, one or more embodiments provide the advantage of increased coverage of memory or memory-access faults, due to the interleaving of frame counter bits and data bits; this increase in coverage facilitates the detection of partially frozen images, which would be hard to achieve with protection bits added outside the "raw" data buffer. As a third example, one or more embodiments provide the advantage of virtually no constraints imposed on the access patterns of producer/consumer IPs to the protected buffers: partial writing and partial reading of a frame are supported and any sequence of accesses is enabled.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

By way of general introduction, it will be once more recalled that, while the ensuing detailed description will refer for the sake of simplicity to images (e.g. video frames), the "freezing" hazard as addressed by one or more embodiments can affect sampled data other than images (for instance, digitized radar echoes). Consequently, throughout the instant description, images/frames are to be construed as generally exemplary of sample data sets exposed to the hazard of becoming "frozen" with the disadvantages/risks associated to such a hazard.

Also, throughout this description, the designation "IP" is used to indicate a semiconductor intellectual property core, IP core, or IP block, namely a re-usable unit of logic, cell, or integrated circuit layout design. IP cores can be used as building blocks e.g. in application-specific integrated circuits (ASICs) or field-programmable gate arrays (FPGAs).

One or more embodiments may be applied to facilitating correct operation of a system in response to its inputs, including safe management of operator errors, hardware and software failures and environmental changes.

One or more embodiments may rely on watermarking techniques.

Figure 1:
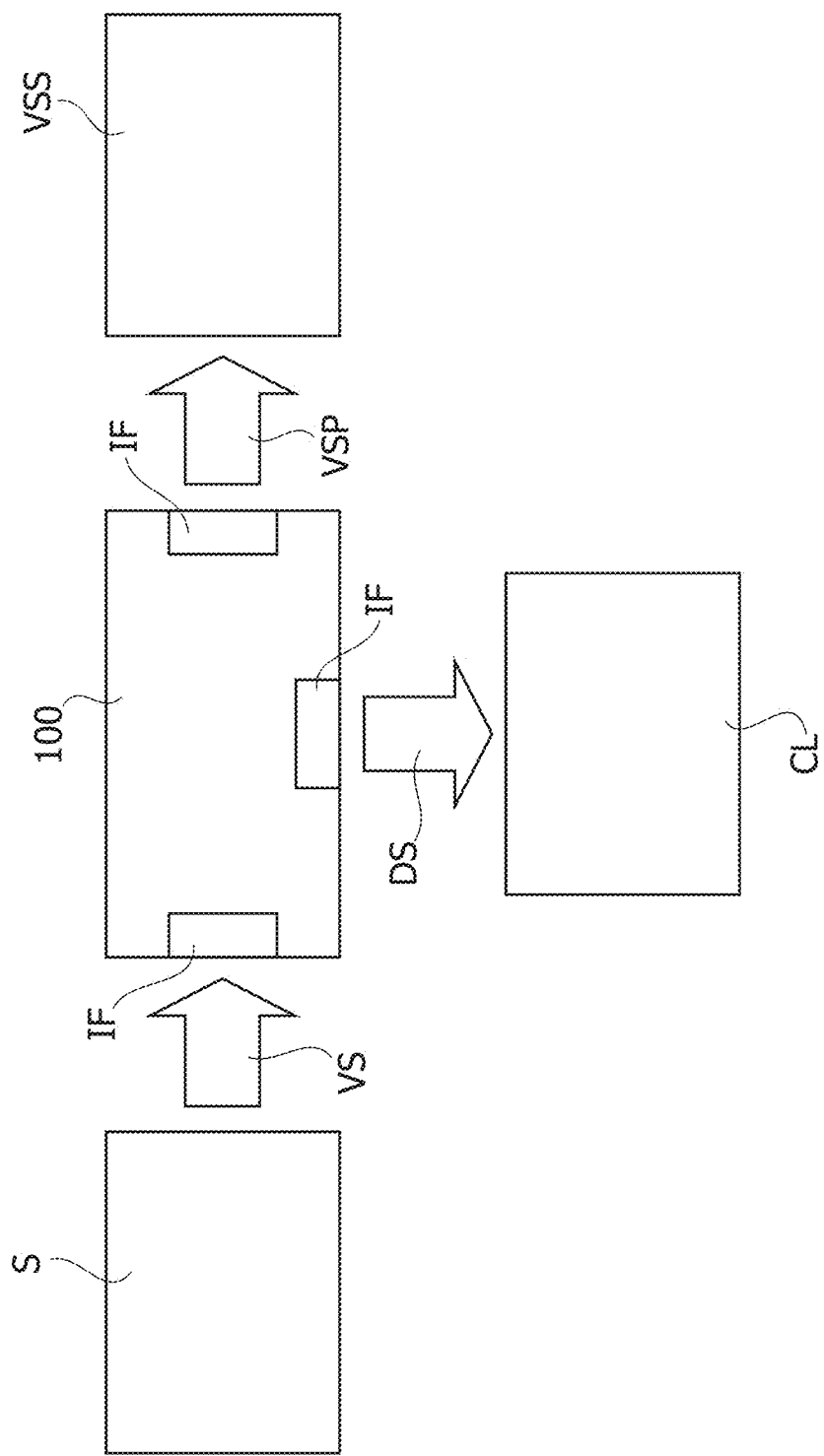
FIG. 1 is a block diagram exemplary of a possible context of use of embodiments.

One or more embodiments may apply to systems as depicted in FIG. 1, that is systems which receive one or more video streams VS (or other sampled data sets as discussed previously) from one or more external sources (like a camera) S and process those streams, e.g. in a data processing circuit 100, in order to produce processed video streams VSP for external sinks VSS (such as a display unit) and/or additional data streams DS to be used e.g. in a control loop CL. In a system as exemplified in FIG. 1 exchange of data with the processing circuit 100 takes place via I/O interfaces IF.

The processing circuit 100 may store (in a non-volatile or volatile manner) images or other sets of sampled data or parts of them in data buffers, which are thus exposed to the frozen image hazard—as discussed in the introductory portion of this description—as a result of unexpected events occurring "internally" of the circuit 100, as opposed to images that become frozen at the source S or at the sinks VSS (that is externally to the circuit 100).

A circuit as the processing circuit 100 may also include features for checking that the input/output streams did not or cannot get frozen on the source/sink side: these features are per se conventional and will not be discussed here for brevity.

The interfaces IF in the circuit 100 can represent a possible source of frozen images insofar as they include building blocks that are based on or deal with internal buffering.

Conversely, while containing data storage elements, hardware building blocks such as pipelines and FIFOs can in most cases be excluded as possible sources of frozen images: the associated stored data content is usually consumed/destroyed when read (that is, reading a same realistic output data sequence out of a pipeline is highly unlikely to occur, unless this is fed twice with a corresponding input data sequence).

An exception may be represented by HW FIFOs implemented internally of the circuit 100 "on top" of RAM blocks: if such a memory is sized larger than a full image, in case of a HW fault one cannot exclude that such a FIFO might produce a frozen image at its output while the input is not frozen.

In the presence of a memory buffer large enough for storing a full image (or a relevant part of it), images can get frozen, starting from that buffer, when the buffer content is not properly refreshed before being read.

It is noted that buffer annotation with an associated frame counter can be contemplated as a way of addressing the frozen image hazard. This kind of solution makes an occurrence of frozen image hazard detectable in real time by giving a marked identity to the contents of the buffers (the image data) in comparison with the containers alone (the buffers, identified by their location/address in the system memory).

By resorting to such a solution an identity can be given to frame data by writing a frame counter (a numerical value evolving on each frame following a specified rule) in the same buffer as the frame data, in a single instance and outside the memory footprint of the data (for example as a header or a footer to the data).

Figure 2:
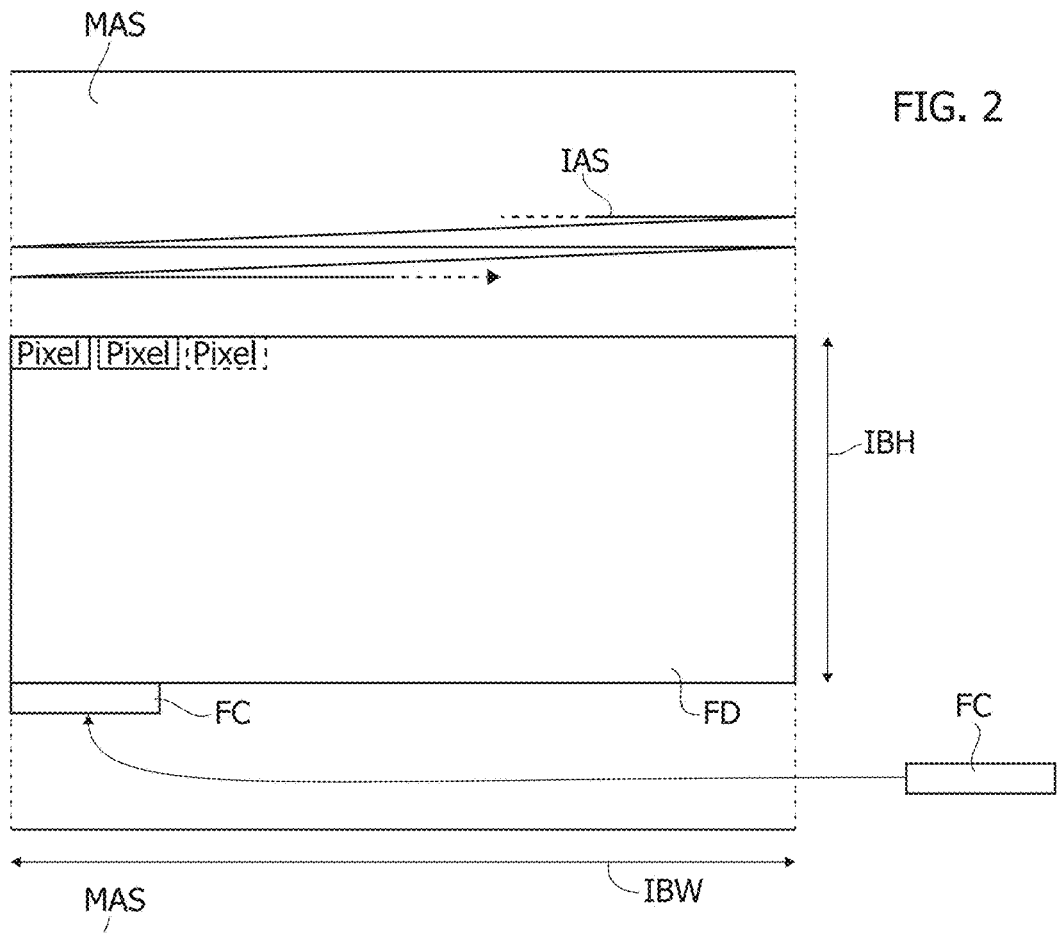
FIGS. 2 and 3 are diagrams exemplary of solutions for managing storage of images in image buffers.

Such an approach is exemplified in FIG. 2. In FIG. 2, a memory addressing space MAS is shown having an image buffer width IBW, with images (frame data FD) stored on a pixel-per-pixel basis over an image buffer height IBH. Images (frames) can be addressed by resorting e.g. to a zig-zag image addressing scheme IAS with an identity given to frame data FD by writing a frame counter FC e.g. as a footer (or a header) to the data.

The task of adding the frame counter FC to the image data can be assigned to the block producing the image, while each block consuming a same image will be in charge of checking the match between the counter found together with the data and a "private" copy, computed locally for the current frame based on a rule shared between the producer and the consumer blocks.

It is observed that a limitation of this approach may lie in having stored outside the raw footprint (e.g. the IBH×IBW footprint) of the frame data FD a localized instance of the frame counter FC. If e.g. a hardware fault causes a damage to the capability of the data section in the buffer of being written without affecting the section hosting the frame counter value, images would become fully or partially frozen; however, the frame counter would keep running and the fault would go undetected when the contents of the buffer (counter FC and data FD) are read and the counter value provided compared with the expected value.

Storing the frame counter FC outside the data footprint leads to increasing the overall size of the buffer, which may cause buffer allocation issues in the presence of strong quantization of the allowed sizes. Compatibility with non-safe (e.g. legacy) hardware IPs could also be compromised by such an increase in buffer footprint.

Figure 3:
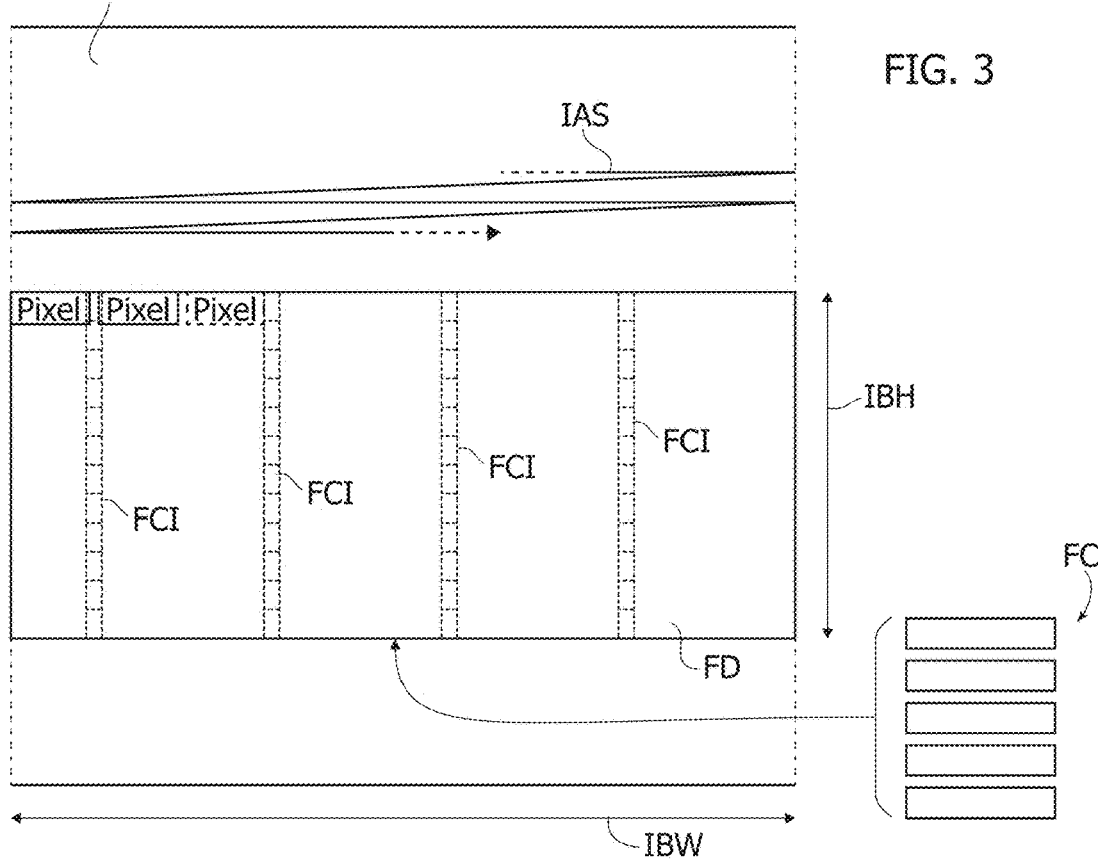

One or more embodiments may address that issue by resorting to the approach exemplified in FIG. 3.

In FIG. 3 parts or elements like parts or elements already discussed in connection with FIG. 2 are indicated with like references, and a corresponding description will not be repeated for brevity.

The approach exemplified in FIG. 3 provides for the use of one or more frame counter instances FCI which may be associated with respective sections of the frame data FD within the buffer, so that the counter information is embedded (e.g. watermarked) in the information stored in the buffer, e.g. by being fragmented (that is "broken up" in pieces or portions, notionally down to the single bit level) and distributed over the data FD within the buffer.

In one or more embodiments, the binary representation of the respective counter (possibly in the form of plural instances) can be fragmented into a number of smaller fragments, optionally down to single-bit fragments, with those fragments distributed over the memory space via interleaving (possibly with a one-bit position resolution) with the data bits of the data in the data set FD.

In the approach exemplified in FIG. 3, the following features are observed. Firstly, the buffer memory footprint is not increased: the bits carrying the frame counter values FCI (irrespective of whether representing one single instance or plural instances of a frame counter) are written in the image data portion of the buffer (not in a header or footer). Secondly, the number of bits carrying the frame counter value added to each frame can be made configurable: for instance, multiple instances FCI of the frame counter value can be stored in a single image. Thirdly, the positions in the buffer of the different portions into which a frame counter (or each frame counter instance) is fragmented are configurable, possibly on a single bit basis and with a one-bit resolution.

Also, two possible cases can be considered. In the first case, the pixel and frame format of an image (data FD) includes an amount of padding sufficient for storing the bits of the one or more instances of the frame counter value without any loss in terms of image content (that is, without overwriting image data bits). In this first case, the feature of configuring the positions in the buffer of the different portions into which the frame counter is fragmented facilitates targeting an available padding with a certain resolution. Additionally, the feature of configuring the number of bits carrying the frame counter value added to each frame facilitates leveraging the available padding (a denser layout of frame counter bits in a buffer makes partially frozen images detectable when resulting from a fault affecting a smaller section of memory). In the second case, the padding specified by the pixel and frame format of an image is not enough, so that storing the bits of the one or more instances of the frame counter value involves overwriting some of the image data bits. In this second case, the feature of configuring the positions in the buffer of the different portions into which the frame counter is fragmented facilitates targeting known bits of known pixels, for example LSB bits of pixels at the edges of an image, so that overwriting them involves reduced data loss in the image. Moreover, such data loss is controllable as a trade-off between its amplitude and the corresponding degree of protection against partially frozen images (which depends on the frequency/density of the frame counter bits in the buffer).

Most commercially available image-processing IPs are based on full-frame storage (production towards addressable memory and/or consumption from addressable memory) and are inherently exposed to the frozen image hazard. A majority of them, for expected use in consumer market applications not targeting functional safety, do not provide any autonomous protection against that hazard.

One or more embodiments aim at providing a solution which is modular and compatible with similar IPs. One or more embodiments can also be directly integrated in such IPs by taking into account compatibility/modularity issues.

Modularity/compatibility may be related to the fact that the bits of the frame counter are kept in the buffer footprint in the memory, so that existing HW IPs can be protected against the frozen image hazard by simply intercepting the transactions to and from (even a portion of) an addressable memory space without modifications in the IPs.

One or more embodiments may be, so-to-say, split over two IPs, namely a Watermark Inserter and a Watermark Extractor, which can be plugged to output and input ports (to/from addressable memory), respectively, of existing unprotected IPs.

Figure 5:
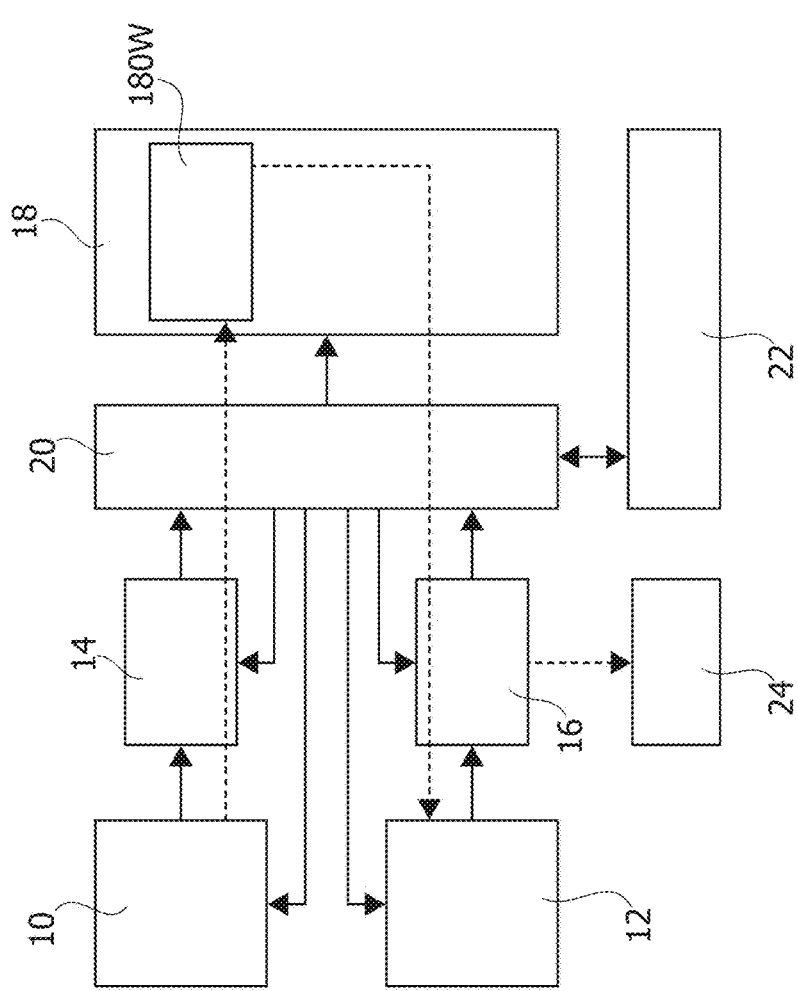
FIGS. 4 and 5 are block diagram comparing various solutions for integrating frame producer and consumer IPs.
Figure 4:
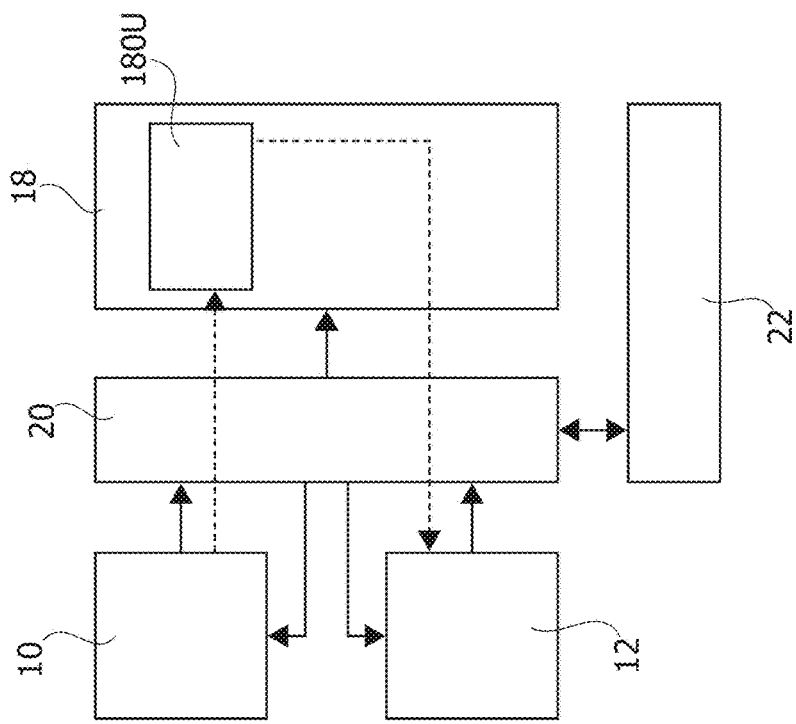

The diagrams of FIGS. 4 and 5 depict non-safe and safe integration, respectively, of producer and consumer IPs for the same frames.

In FIGS. 4 and 5, reference 10 indicates a frame producer circuit block which produces frames and reference 12 indicates a frame consumer circuit block which consumes frames.

In the diagram of FIG. 5, which is exemplary of safe integration, watermark inserter and watermark extractor circuit blocks 14 and 16 are coupled to the frame producer and the frame consumer blocks 10 and 12, respectively.

As used herein, watermarking will refer to any known technique which may be adopted for including information in a certain set of data, with the capability of detecting and extracting (recovering) such information, e.g. for gaining insight on its origin or provenance.

In FIGS. 4 and 5, reference 18 indicates a memory circuit and the solid arrows indicate a memory/registers interface oriented from a master side (initiator of the transaction and producer of its address and size) to a slave side with thicker arrows representing interfaces transporting image data.

The dashed arrows show the path and direction of image data transfers.

A Network on Chip (NoC) circuit block 20 represents the set of interconnections between the addressing space master and slave blocks of the system, including the memory subsystem(s) and, possibly, a CPU 22.

A fault collection circuit block 24 is also shown in FIG. 5, coupled with the watermark extractor circuit 16.

The watermark inserter block 14 and the watermark extractor block 16 in FIG. 5 jointly protect the system against the frozen image risk, by giving (via inserter circuit block 14) a "strong" identity to the content of memory buffers and by checking (extractor circuit block 16) that identity, thus facilitating consumption of the contents produced as expected (that is the desired number of times and in the desired sequence).

This is highlighted in FIGS. 4 and 5 by labeling the buffers in the memory 18 as unprotected buffers 180U (FIG. 4) and as protected, watermarked buffers 180W (FIG. 5).

In one or more embodiments, both functionalities (that is insertion 14 and extraction/check 16) can be implemented as stand-alone HW circuit blocks that facilitate physical connections between buffers content producer/consumers HW blocks and the NoC 20. This relieves producer/consumer IPs from the burden of providing such safety-specific functionalities while making it possible to avoid intermediate storage between content production and identity insertion, on the one side, and between identity extraction/checking and content consumption, on the other side. Such a storage might in fact facilitate a safety breach.

For simplicity and ease of explanation, in the exemplary diagrams of FIGS. 4 and 5 a single frame producer circuit block 10 and a single frame consumer circuit block 12 are considered with these blocks illustrated as separate entities with their own interfaces to the rest of the system; correspondingly, a single instance of the watermark inserter block 14 and a single instance of the watermark extractor block 16 are exemplified.

Real systems however can be (much) more complex, with multiple producer/consumer blocks and, possibly, blocks that are both consumers and producers of images.

Figure 6:
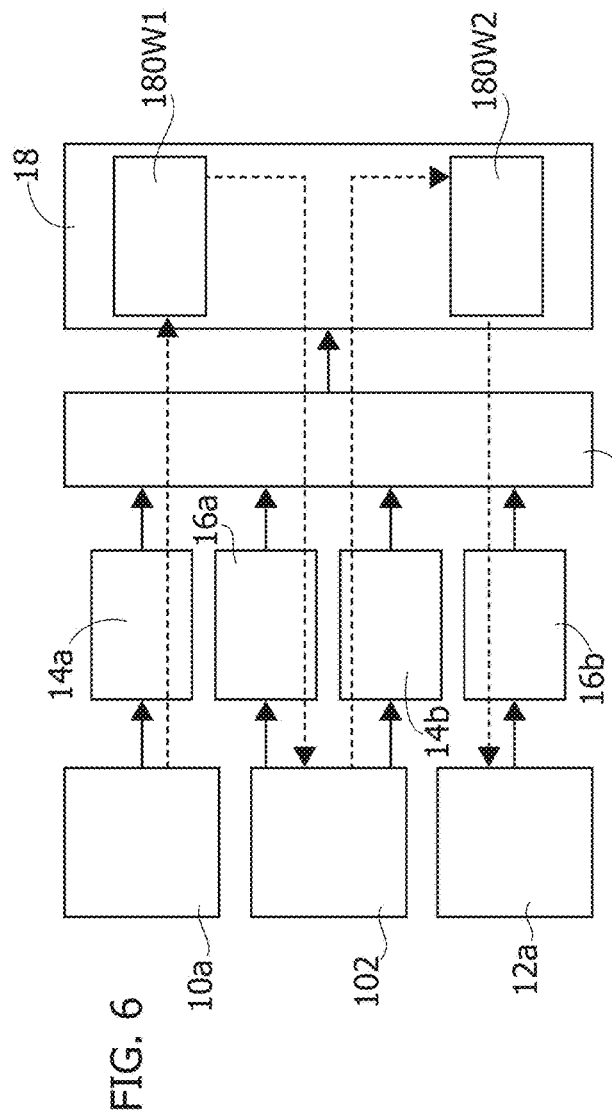
FIGS. 6 and 7 are block diagrams exemplary of possible developments of the solution of FIG. 5.
Figure 7:
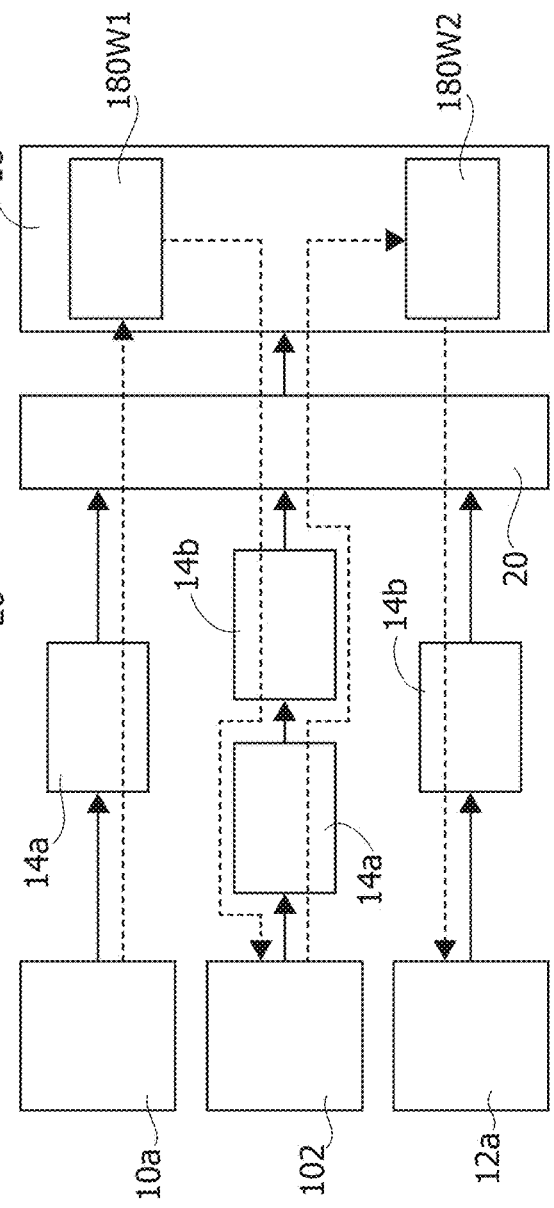

The diagrams of FIGS. 6 and 7 provide examples of these more complex systems, including (again interfacing with a the memory 18 via a NoC 20) e.g. a "legacy" camera interface 10a (with an associated watermark inserter circuit block 14a), a legacy image processor 102 (with associated watermark inserter and extractor circuit blocks 14b and 16a) and a legacy display controller 12a (with an associated watermark extractor circuit block 16b).

In the example considered both a watermark inserter circuit block 14a and an extractor circuit block 16a are associated to the image processor 102 as this is assumed to implement dedicated master interfaces for consuming/reading frames and for producing/writing them (from/to specific buffers in the memory 18). By way of further example, the case of a single read/write interface, shared among the consumer and producer entities of the block, is also possible.

In one or more embodiments, a watermark inserter circuit block may be transparent to read transactions and a watermark extractor circuit block may be transparent to write transactions, so that a same circuit block can be used, as exemplified in the diagram of FIG. 7.

In FIG. 7 parts or elements like parts or elements already discussed in connection with FIG. 6 are indicated with like references, and a corresponding description will not be repeated for brevity.

In both FIGS. 6 and 7 the data flows indicated by dashed arrows can be provided as multiple parallel/independent channels with each channel adapted to leverage multiple buffers 180W1, 180W2, . . . (e.g. ping-pong buffers) in the memory 18.

This can be supported by the watermark inserter circuit block and the watermark extractor circuit block due to their capability of inspect write and read transactions (respectively) in respect of a set of buffers, rather than a single one. For instance, each buffer can be described (in terms of run-time programmable configuration of the two IPs) in terms of e.g. enabling, absolute base address in the addressing space of the system, relative bit-position of each bit in the buffer dedicated to hosting one of the frame counter instance bits, current frame counter value (which can be written by a watermark inserter circuit block and "expected" by a watermark extractor circuit block).

In one or more embodiments, the task of updating (e.g. on frame boundaries) the frame counter value stored in the instance or instances of the watermark inserter block (e.g. 14, 14a, 14b) and the watermark extractor block (e.g. 16, 16a, 16b) can be assigned both to hardware (HW) and software (SW) functions in the corresponding circuit blocks. The latter approach (SW) avoids the use of dedicated signals (wires) from producer/consumer IPs and embedding in the HW the rule for the computation of the next value, while facilitating partial read-outs of the image buffer.

Various details of possible ways of implementing one or more embodiments will be discussed in the following concerning e.g. dimensioning and interface standards at system level. These details are presented merely by way of non-limiting examples, with other dimensioning and interface options available to those of skill in the art for implementing one or more embodiments.

Also, the following exemplary discussion provided in respect of one watermark inserter circuit block 14 and one watermark extractor circuit block 16 may apply to embodiments including plural watermark inserter circuit block 14a, 14b, . . . and/or plural watermark extractor circuit block 16a, 16b, . . . .

Implementation options common to watermark inserter IPs (e.g. 14, 14a, 14b) and watermark extractor IPs (e.g. 16, 16a, 16b) may include: AXI4 slave and master interfaces, instantiation-time-configurable up to: 256 bits data-width; 32 transaction IDs; 32 outstanding transactions; and APB slave interface. The implementation may further include up to 4 monitored buffers and up to 4 tracked frame counters per block instance, with programmable association between each buffer and one of the counters (multiple buffers sharing the same counter can be supported). The implementation may also include up to 64 monitored (written/checked) bits per buffer, with per-bit fully programmable placement (byte offset from buffer start address, bit number inside the addressed byte) and source (frame counter bit number); up to 16 bits per frame counter; SW-driven frame counters update; HW lock-step with run-time fault injection support; and True-bypass mode.

Watermark inserter IPs may include a Data-Before-Request reordering feature.

Figure 8:
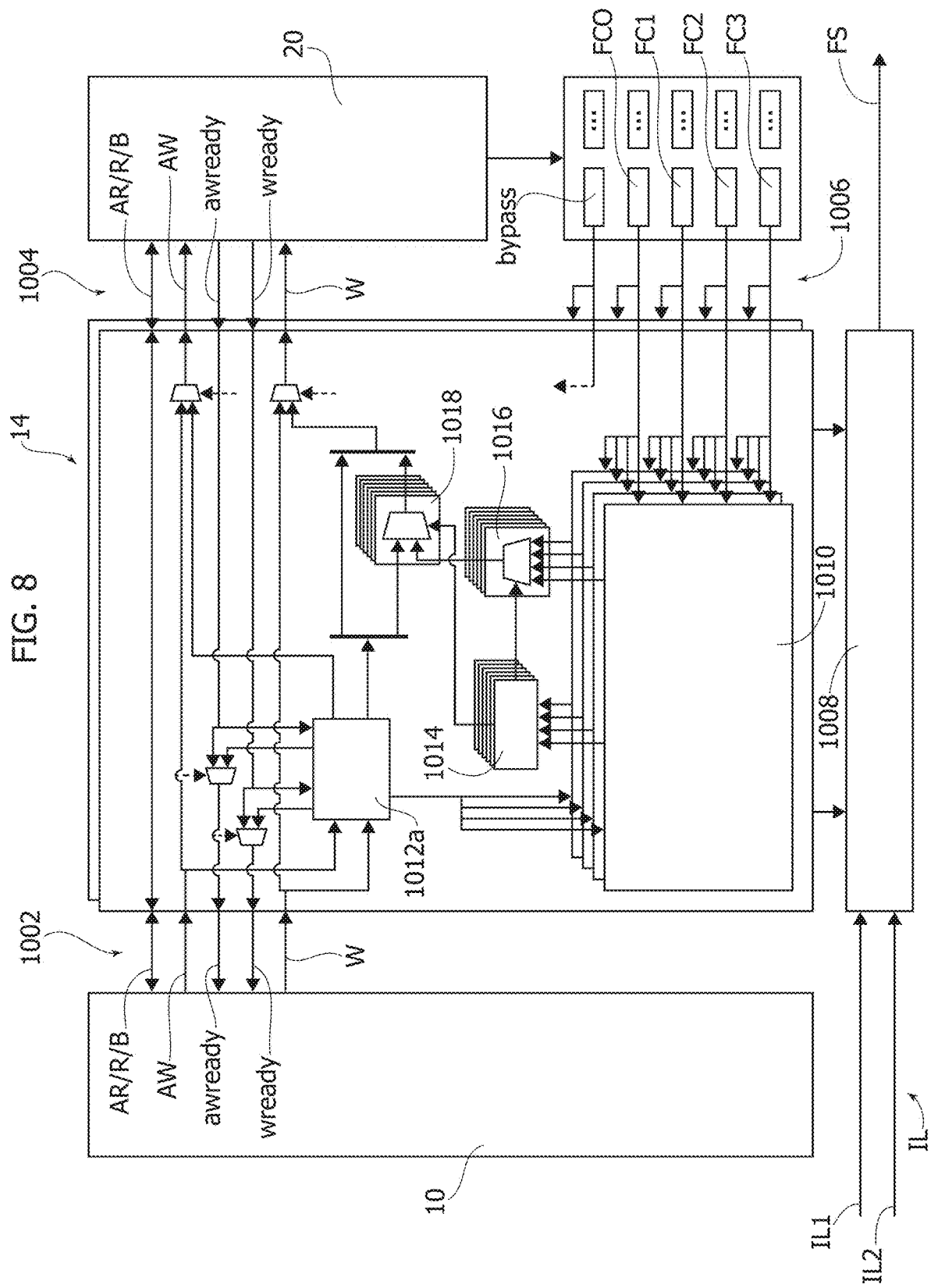
FIG. 8 is a block diagram exemplary of a possible embodiment of a watermark inserter.
Figure 9:
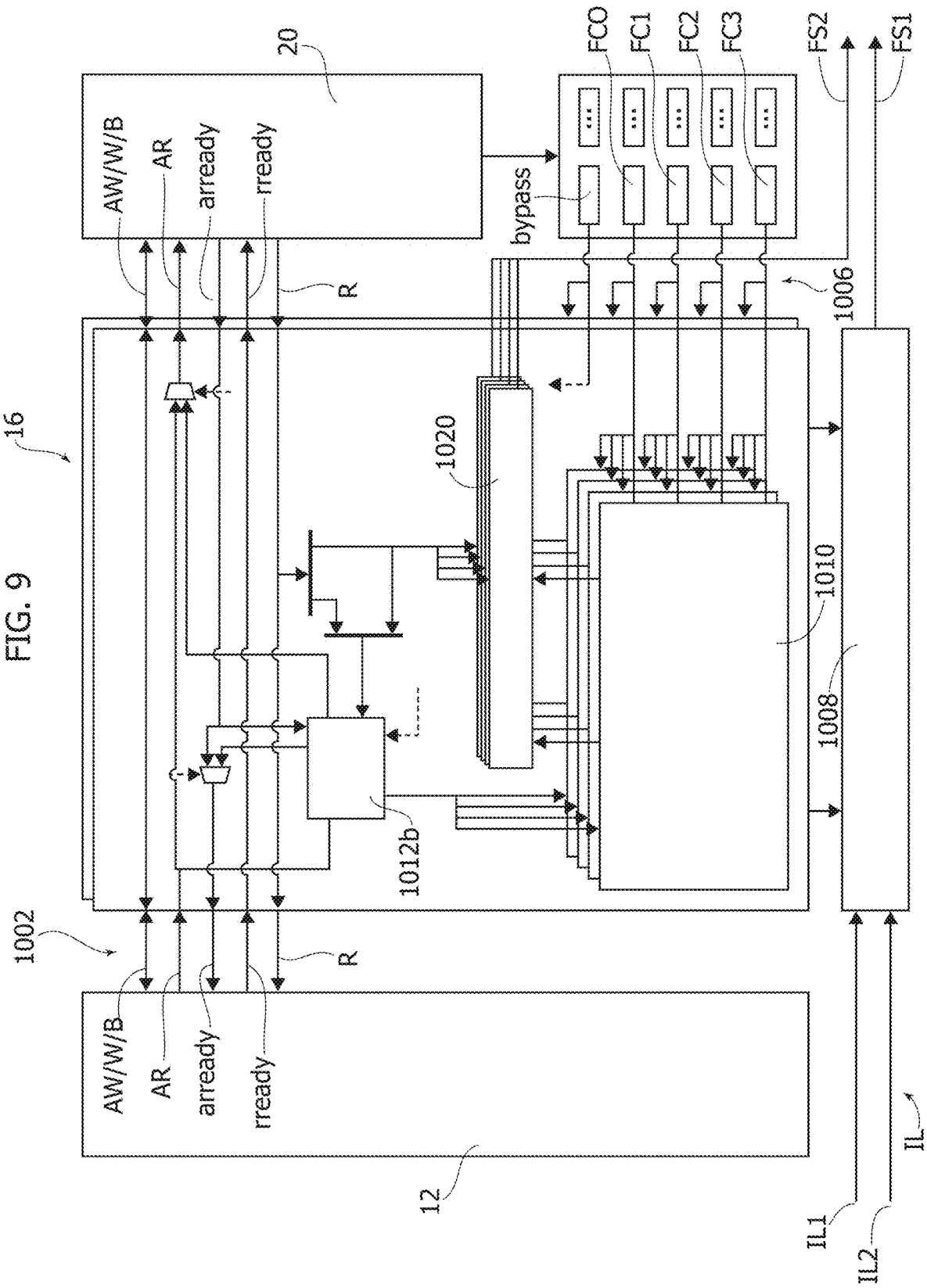
FIG. 9 is a block diagram exemplary of a possible embodiment of a watermark extractor.

The diagrams of FIGS. 8 and 9 are exemplary of the internal structure of possible implementations of a watermark inserter circuit block 14 (e.g. in FIG. 8) and a watermark extractor circuit block 16 (e.g. in FIG. 9).

The top-level block diagrams of both circuit blocks of FIGS. 8 and 9 are similar, insofar as they can share a same set of external interfaces: a slave AXI4 port 1002 connected to the corresponding master AXI4 port of the initiator HW block (10 or 12) writing or reading frame buffers from the system addressing space (see e.g. the memory 18 and the NoC 20 in FIGS. 5 to 7); a master AXI4 port 1004 connected to the system NoC 20 (that implements the system addressing space); and a slave APB port 1006 connected to the system NoC 20.

A watermark inserter circuit block 14 and a watermark extractor circuit block 16 as shown in FIGS. 8 and 9 can also share a same approach for functional safety. For instance, the logic of both blocks 14 and 16 can be fully duplicated and all output signals from the two instances are compared by a dedicated comparator block 1008 that produces a fault signal on a line FS in case of mismatch.

In one or more embodiments, configuration registers may not be duplicated, with their functional safety facilitated by means of data storage protection (parity). For instance each register can feed both instances of the logic.

The comparator block 1008 can also be connected to the Feedback Control Unit (FCU, not shown in the figures) e.g. by: the output line FS conveying the fault event signal as discussed previously; and input lines IL carrying fault injection signal IL1 and fault event clear signal IL2.

The circuit blocks of FIGS. 8 and 9 may also exhibit various similarities in terms of internal structure. By way of example, both blocks 14 and 16 can monitor and possibly modify only a subset of the channels in the AXI4 interface 1002.

By way of example, in one or more embodiments: the inserter block 14 deals with the AW and W channels, and just forwards the AR, R and B channels from the slave port to the master port without any kind of modification, including timing aspects; and the extractor block 16 deals with the AR and R channels, and just forwards the AW, W and B channels from the slave port to the master port without any kind of modification, including timing aspects.

For those channels that are dealt with, a true bypass can be internally supported by means of dedicated multiplexers driven by a common SW-accessible configuration bit.

Both circuit blocks of FIGS. 8 and 9 can include a set of instances (e.g. one per monitored buffer) of a same beat watermark computer block 1010, which is in charge of translating an AXI4 data-width-word address into a couple of data-width-wide buses specifying for each AXI4 data bit (in terms of word address and bit position inside the word): whether it is a target position for watermark insertion or extraction; and the expected value of the bit (relevant only if it is a target position), to be overwritten to the original content in the case of the inserter 14, to be compared to the watermarked content in the case of the extractor 16.

In one or more embodiments, the rest of the internal components may be specific to each one of the two blocks 14 and 16 of FIGS. 8 and 9.

This may apply e.g. to "SRMD to MRMD" (Single-Request-Multiple-Data to Multiple-Request-Multiple-Data) circuit blocks 1012a, 1012b, that, despite sharing a same designation and playing a same general role, may involve different specific implementations in the diagrams of FIGS. 8 and 9 resulting from the different sets of AXI4 channels managed (at 1002) in the two cases.

A common "SRMD to MRMD" role to the two implementations 1012a (inserter—FIG. 8), 1012b (extractor—FIG. 9) is to compute the AXI4 data-width-word address for each AXI4 data beat, starting from a single request (received over the AW channel in the inserter case and over the AR channel in the extractor case and in both cases specifying the base address of the data burst) and from the multiple data burst (received over the W channel in the inserter case and over the R channel in the extractor case and in both cases defining the timing of each data beat). For both the inserter and the extractor block the AXI4 data-width-word address computed by the "SRMD to MRMD" block is supplied to the set of beat watermark computer blocks 1010 discussed previously.

In addition to the baseline beat-address-computation functionality, in the inserter case (FIG. 8) and when true bypass is not enabled, the "SRMD to MRMD" block 1012a is also in charge of: driving the "ready" signals for both the AW and W channels; stalling the W channel in case of data-before-request occurrence; and stalling the AW channel in case of request-before-data occurrence.

In the inserter case of FIG. 8, the logic downstream the beat watermark computer 1010 includes, for each AXI4 data-width bit: a priority encoder 1014 that arbitrates the target position flag among the e.g. four monitored buffers (e.g. with a hardcoded priority scheme) and accordingly computes a global target position flag and a buffer selection ID (2 bits); a multiplexer (e.g. 4-to-1) 1016, which is driven by the selection ID just discussed and selects an arbitrated expected value among the various monitored buffers; and a further multiplexer (e.g. 2-to-1) 1018, which is driven by the global target position flag just discussed and selects either the "original" data bit (coming from the transaction originator) or the "watermark" bit.

In addition to the baseline beat-address-computation functionality, in the extractor case (FIG. 9) and when true bypass is not enabled the "SRMD to MRMD" block 1012b is also in charge of: driving the "ready" signals for the AR channel (but not for the R one, which is simply forwarded); and stalling the AR channel in case the maximum number of outstanding transactions is reached.

In the extractor case of FIG. 9, the logic downstream the beat watermark computer 1010 includes, for each monitored buffer, bit checker block 1020 that for each beat-address-specific target position compares the expected value and the value received from the master port and asserts the corresponding error event line in case of mismatch.

Those lines are routed to the FCU and/or to one or more of the interrupt controllers of the system (e.g. System on Chip or SoC).

In one or more embodiments, both circuit blocks of FIG. 8 (inserter) and FIG. 9 (extractor) can monitor the transactions to/from system memory 18 that are commanded by a HW block or subsystem to which they are attached. Watermark inserter blocks may be capable of modifying the payload of those transactions, in terms of payload content, but not in terms of payload size, while watermark extractor will not be capable of modifying the transactions that they monitor.

In one or more embodiments, circuit blocks as shown in FIG. 8 (inserter) and FIG. 9 (extractor) will be able to monitor a set of e.g. up to four memory-hosted uncompressed full frame buffer, each.

In one or more embodiments, at run time and under software control, each uncompressed full frame buffer in use by the system will be expected to be consistently described (see below) in a corresponding inserter block 14 (attached to a content producer) and a corresponding extractor block 16 (attached to a content consumer). Each block 14, 16 will be able to store internally (in a SW-accessible register) a set of e.g. four frame counter values. Each one of the buffers monitored will be associated by means of a configuration register to one of the (e.g. four) frame counters. As a result, each frame counter register can be made specific to each monitored buffer or shared among up to all the four buffers of the same block.

In one or more embodiments, watermark inserter blocks 14 are in charge of storing, for each of the monitored buffers, a specified number of instances of the configured frame counter bits into the frame buffer. This happens while the frame-writer block is actually writing the buffer and by modifying, on-the-fly, specific bits in the payload of relevant transactions, while not modifying in any way the payload of not relevant transactions and the overall sequence of transactions.

In one or more embodiments, watermark extractor blocks 16 are in charge of reading, for each of the monitored buffers, a specified number of instances of the configured frame counter bits from the frame buffer. This happens while the frame-reader block is actually reading the buffer (or a part of a buffer), while not interpreting in any way the payload of not relevant transactions and while not modifying in any way the payload and the overall sequence of the transactions. For a given buffer and frame counter value, watermark extractor blocks check that all the read frame counter bits instances values match the internally stored values.

For both watermark inserter and extractor blocks 14, 16, internally stored frame counter values can be selectively updated (by a monitored buffer) under SW control.

In one or more embodiments, protection obtainable by the use of a watermark inserter/extractor pair is complete against fully frozen images (the entire buffer is not updated before being fully read a second time). Protection against partially frozen images may be provided on a statistical basis: in this case, the probability of detecting a partially frozen image depends both on the size of the not-updated region and on the number and spread of frame counter bits instances per frame.

For example, protection against partially frozen images can be complete in cases where the distribution of targeted bit position in the buffer and the smallest size of the read and write bursts reaching the buffer make it possible for any burst to cover at least one target bit containing the least significant bit of the frame counter.

As already noted, the storage of frame counter instances (single or plural) can be lossy or lossless in terms of image contents depending on the presence of enough padding in the monitored buffers: if padding is present and both written and read by the frame producer/consumer blocks, frame counter instances can be placed over the padding instead of overwriting any image content.

In one or more embodiments, in order to mitigate losses of image content when no padding or insufficient padding is available in the buffer, storage locations for one or more frame counter instances can be specified on a bit basis, so that each frame counter instance can be spread over multiple pixels and affect e.g. only the least significant bit of one or more of their pixels/channels.

In one or more embodiments, watermark inserter and extractor blocks 14, 16 may rely on the same kind and amount of information about each of the addressing-space-hosted buffer that they monitor.

For instance, the following can be configured for each buffer by SW-programmable registers: a 32-bit base address, aligned like the data-words transferred on the slave and master AXI4 ports (so the number of LSBs involved is hardcoded to 0); 64 target bit configurations, each including: a 32-bit byte offset, relative to the buffer base address; a 3-bit bit position in the identified byte; a 4-bit bit position in the frame counter; a 1-bit watermarking insertion/extraction (checking) enable flag; and a 2-bit index identifying the frame counter to be used, out of the four available at block level.

One or more embodiments may provide for no enable flag being provided specific to the 64 target bits configurations: less than 64 active ones, down to a single one per buffer, can be obtained by duplicating the same values for multiple configurations (collisions in terms of target bit position inside the buffer are handled by a fixed priority scheme).

Aside from the buffer-specific configuration, a few SW-programmable configuration registers may include: a 1-bit true bypass flag; and four 16-bit frame counters.

Figure 10:
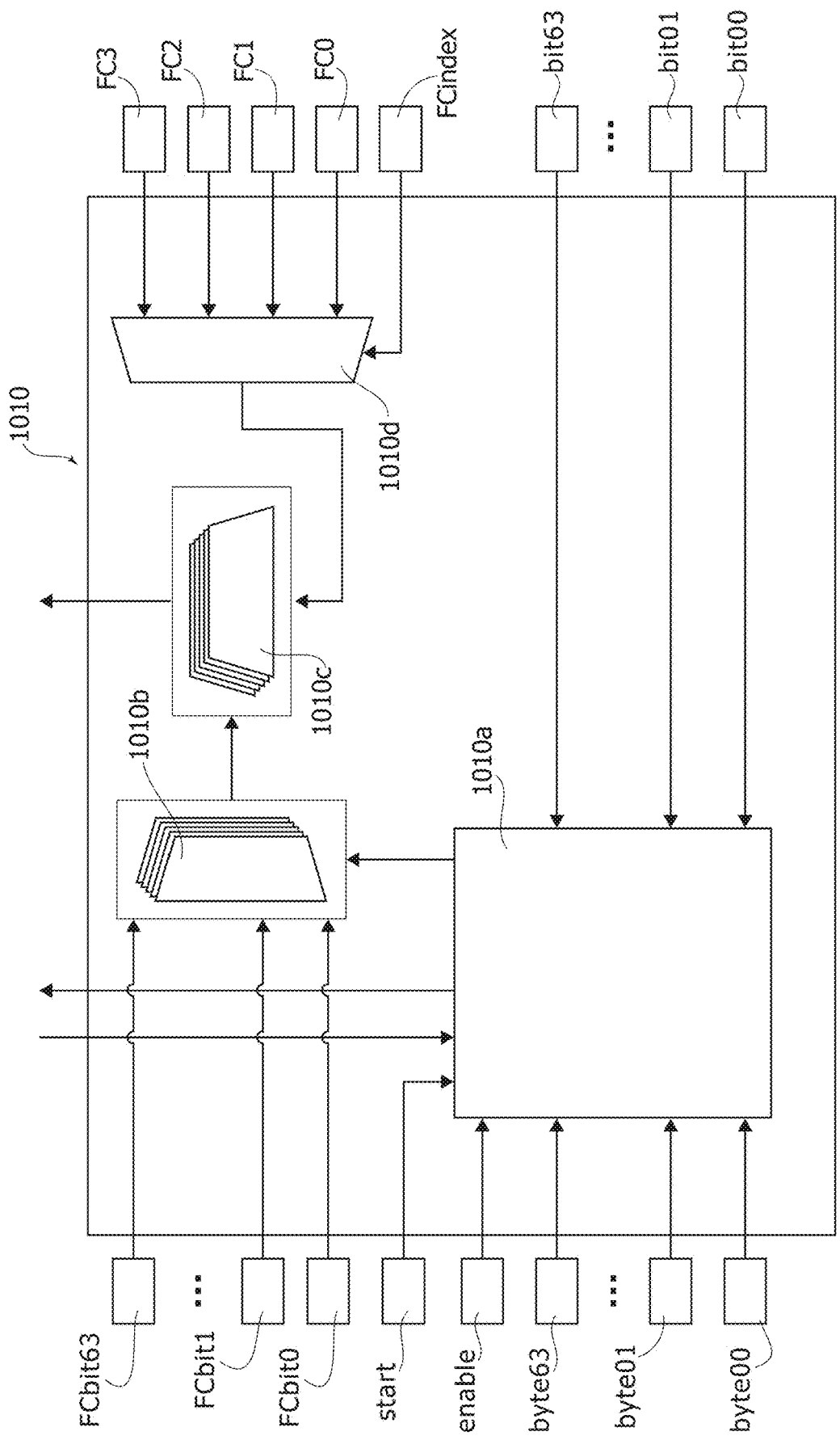
FIG. 10 is a block diagram exemplary of possible details of embodiments.

Further details of possible implementations of embodiments are provided in connection with the diagram of FIG. 10. Again, these details are presented merely by way of non-limiting examples, with other implementing options available to those of skill in the art for implementing one or more embodiments.

In one or more embodiments, aside from the true bypass flag, used for driving the multiplexers discussed previously, the other registers feed the beat watermark computer blocks 1010, common to the inserter block exemplified in FIG. 8 and the extractor block exemplified in FIG. 9 and instantiated per-monitored buffer (e.g. 4 times).

A possible internal structure of a beat watermark computer blocks 1010 is shown in the diagram of FIG. 10.

The matching of the beat-address to the target bits positions and the handling of the enabling flag are managed by a so-called byte/bit matcher circuit block 1010a that is detailed in the following and that for each input address produces two data-width-wide arrays: an array of "matched" 1-bit flags; and an array of "matched entry" 6-line buses identifying the matching target bit configuration.

The first array directly exits the block and feeds downstream logic at inserter block 14 and extractor block 16 integration level.

The second array drives a data-width-wide array of 64×4-to-1×4 multiplexers 1010b in charge of looking up the registers-hosted values specifying the source frame counter bit per target bit configuration.

The output of this array of multiplexer is a data-width-wide array of 4-lines buses that drives a second data-widthwide array 1010c of 16-to-1 multiplexers, that implement the actual selection of the frame counter bit.

The aggregation of single-bit output of these multiplexer builds the second output of the beat watermark computer block; the 16 inputs of these multiplexers are fed by a 4×16-to-1×16 multiplexer 1010d driven by the frame counter index register and that implements the per-monitored-buffer frame-counter selection.

A subset of the buffer-specific registers can be connected to the byte/bit matcher block 1010a, e.g. those describing the e.g. 64 positions of the target bits in the buffer. In addition to these registers, the circuit block 1010a receives the word address lines ultimately coming from the SRMD-to-MRMD block 1012a, 1012b.

Still further details of possible implementations of embodiments are provided in a co-pending Italian patent application filed on even date in the name of the same Assignee. These details concern the possibility of providing an end-to-end frozen image prevention and detection mechanism, which operates directly on the uncompressed frame buffers. By adopting such an arrangement embedding of frame counter information and its checking is simplified (e.g. by lossless encoding frame counter information embedded in uncompressed full frame buffers) thus making it possible to reliably detect occurrence of frozen image events in compressed full frame buffers.

A method, according to one or more embodiments may include: storing at least one set of data in a memory space, wherein the at least one set of data stored has a memory footprint in the memory space; and coupling to the data set a respective counter identificative of the data set, wherein the method includes embedding the respective counter in the at least one set of data by avoiding increasing said memory footprint in the memory space.

One or more embodiments may include fragmenting the binary representation of the respective counter into a number of smaller fragments, possibly down to single-bit fragments, and distributing those fragments over the memory space via interleaving, possibly with a one-bit position resolution, with the data bits of the data in the at least one data set.

In one or more embodiments, the memory space may include padding memory areas and the method may include storing bits of the respective counter in the padding memory areas.

One or more embodiments may include overwriting bits of the respective counter over bits of the data in the at least one data set.

One or more embodiments may include overwriting bits of the respective counter over bits of the data in the at least one data set selected out of: the least significant bits of the data overwritten, and/or with the at least one data set (FD) including image data, data bits located at image edges.

One or more embodiments may include providing the respective counter as a plurality of counter instances embedded in the data set, wherein the respective counter is recoverable from the plurality of counter instances embedded the data set.

One or more embodiments may include coupling with the memory space: at least one watermark inserter configured for embedding the respective counter in the at least one set of data; and at least one watermark extractor configured for recovering from the at least one data set the respective counter embedded therein.

One or more embodiments may include: intercepting data transactions involving at least one portion of the at least one data set having the respective counter embedded therein; recovering the respective counter of the at least one data set; checking the respective counter recovered against an expected reference counter value; and issuing a mismatch signal (e.g. an alert signal FS or a signal prompting action countering the effects the freezing event) as a result of a mismatch revealed by said checking.

One or more embodiments may include providing the at least one set of data as image data, wherein the respective counter includes an image frame counter.

In one or more embodiments the at least one set of data may be included in a time sequence of data sets, with the respective counter being indicative of the position of the at least one set of data in the time sequence.

A system according to one or more embodiments may include: a memory space for storing at least one set of data; a counter inserter circuit block configured for coupling with the data set a respective counter identificative of the data set by embedding the respective counter in the at least one set of data and avoiding increasing said memory footprint in the memory space; and a counter extractor circuit block configured for recovering from the at least one data set the respective counter embedded therein, wherein the system is configured for operating with the method of one or more embodiments.

In one or more embodiments such as system may include: a data producer circuit block (e.g. 10) configured for producing the at least one set of data for storing in the memory space; and a data consumer circuit block (e.g. 12) configured for consuming the at least one set of data stored in the memory space.

In one or more embodiments the counter inserter circuit block and the counter extractor circuit block include distinct circuit blocks from the data producer circuit block and the data consumer circuit block, respectively.

One or more embodiments may include a computer program product, loadable in the memory of at least one processing circuit (e.g. 100) and including software code portions implementing the method of one or more embodiments.

Without prejudice to the underlying principles, the details and embodiments may vary, even significantly, with respect to what has been described by way of example only, without departing from the extent of protection.

What is claimed is:

1. A method, comprising:
   storing a set of data in a memory space, wherein the set of data has a memory footprint in the memory space;
   associating, in parallel channels, a respective counter to each of a subset of the set of data, each counter identifying a corresponding one of the subset of the set of data;
   embedding, by a watermark inserter circuit, each counter to the corresponding one of the subset of the set of data without increasing the memory footprint in the memory space;
   selecting, by a first multiplexer, one of the subset of the set of data with an embedded counter; and
   selecting, by a second multiplexer, between the subset of the set of data with an embedded counter and a subset of the set of data without an embedded counter.

2. The method of claim 1, further comprising fragmenting a binary representation of each counter into a plurality of fragments and distributing the plurality of fragments over the memory space via interleaving of the plurality of fragments with data bits of the corresponding one of the subset of the set of data.

3. The method of claim 1, wherein the memory space comprises padding memory areas, and wherein the method further comprises storing bits of the respective counter in the padding memory areas.

4. The method of claim 1, further comprising overwriting bits of the respective counter over data bits of the set of data.

5. The method of claim 4, wherein overwriting bits of the respective counter over data bits of the set of data comprises overwriting least significant bits of the data bits of the set of data.

6. The method of claim 4, wherein the set of data comprises image data, and wherein overwriting bits of the respective counter over data bits of the set of data comprises overwriting data bits located at image edges of the image data.

7. The method of claim 1, wherein the respective counter comprises a plurality of counter instances embedded in each of the subset of the set of data, wherein the respective counter is recoverable from the embedded counter instances.

8. The method of claim 1, further comprising coupling with the memory space:
at least one watermark insertion circuit configured for embedding the respective counter; and
at least one watermark extraction circuit configured for recovering the respective counter.

9. The method of claim 1, further comprising:
intercepting data transactions involving the subset of the set of data having the respective counter embedded therein;
recovering the respective counter;
checking the respective counter recovered against an expected reference counter value; and
issuing a mismatch signal as a result of a mismatch between the respective counter and the expected reference counter value.

10. The method of claim 1, wherein the set of data comprises image data, and wherein the respective counter comprises an image frame counter corresponding to the image data.

11. The method of claim 1, wherein the set of data is included in a time sequence of data sets, and wherein the respective counter is indicative of a position of the set of data in the time sequence of data sets.

12. A system, comprising:
a memory space for storing a set of data, wherein the set of data has a memory footprint in the memory space;
a counter inserter circuit configured to:
couple, to each of a subset of the set of data, a respective counter, each counter identifying a corresponding one of the subset of the set of data,
embed each counter in the corresponding one of the subset of the set of data without increasing the memory footprint in the memory space;
a watermark inserter circuit configured to embed a counter to each of the subset of the set of data;
a first multiplexer configured to select one of the subset of the set of data with an embedded counter;
a second multiplexer configured to:
receive each of the subset of the set of data with an embedded counter from the first multiplexer, and
select between the subset of the set of data with an embedded counter and a subset of the set of data without an embedded counter; and
a counter extractor circuit configured to receive the subset of the set of data from the second multiplexer for recovering the respective counter embedded therein.

13. The system of claim 12, further comprising:
a data producer circuit configured for producing the set of data; and
a data consumer circuit configured for consuming the set of data.

14. The system of claim 13, wherein the counter inserter circuit and the counter extractor circuit are distinct circuit blocks from the data producer circuit and the data consumer circuit, respectively.

15. The system of claim 12, wherein the memory space comprises padding memory areas, and wherein bits of the respective counter are stored in the padding memory areas of the memory space.

16. The system of claim 12, wherein a binary representation of the respective counter is fragmented into a plurality of fragments, and wherein the plurality of fragments of the respective counter is distributed over the memory space via interleaving of the plurality of fragments with data bits of the corresponding one of the subset of the set of data.

17. A computer program product, loadable in a non-transitory memory of at least one processing circuit, comprising instructions for:
storing a set of data in a memory space, wherein the set of data has a memory footprint in the memory space;
coupling, in parallel channels, to each of a subset of the set of data, a respective counter, each counter identifying a corresponding one of the subset of the set of data, wherein each counter is embedded, by a watermark inserter circuit, in the corresponding one of the subset of the set of data without increasing the memory footprint in the memory space;
selecting, by a first multiplexer, one of the subset of the set of data with an embedded counter; and
selecting, by a second multiplexer, between the subset of the set of data with an embedded counter and a subset of the set of data without an embedded counter.

18. The computer program product of claim 17, further comprising instructions for fragmenting a binary representation of each counter into a plurality of fragments and distributing the plurality of fragments over the memory space via interleaving of the plurality of fragments with data bits of the corresponding one of the set of data.

19. The computer program product of claim 17, further comprising instructions for overwriting bits of the respective counter over data bits of the set of data.

20. The computer program product of claim 17, wherein the respective counter comprises a plurality of counter instances embedded in each of the subset of the set of data, wherein the respective counter is recoverable from the embedded counter instances.

* * * * *